(12) United States Patent
Ishihara

(10) Patent No.: US 6,181,455 B1
(45) Date of Patent: Jan. 30, 2001

(54) CYLINDRICAL LENS AND OPTICAL SCANNING DEVICE USING THE LENS

(75) Inventor: Keiichirou Ishihara, Yokohama (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/161,749

(22) Filed: Sep. 29, 1998

(30) Foreign Application Priority Data

Sep. 30, 1997 (JP) .................................................... 9-282740

(51) Int. Cl.⁷ ........................... G02B 26/08; G02B 13/18; G02B 7/02
(52) U.S. Cl. ........................... 359/196; 359/205; 359/207; 359/212; 359/215; 359/216; 359/710; 359/717; 359/819
(58) Field of Search ..................................... 359/708, 710, 359/717, 196–226, 811, 815, 819, 821; 347/256–261

(56) References Cited

FOREIGN PATENT DOCUMENTS

| 0 493 805 | 7/1992 | (EP) . |
| 9-184996 | 7/1997 | (JP) . |
| 9-184997 | 7/1997 | (JP) . |
| 9-243947 | 9/1997 | (JP) . |

OTHER PUBLICATIONS

Patent Abstracts of Japan, vol. 97, No. 11 (JP 9–184997, Jul. 15, 1997), Nov. 28, 1997.

Patent Abstracts of Japan, vol. 98, No. 1 (JP 9–243947, Sep. 19, 1997), Jan. 30, 1998.

Patent Abstracts of Japan, vol. 97, No. 11 (JP 9–184996, Jul. 15, 1997), Nov. 28, 1997.

*Primary Examiner*—James Phan
(74) *Attorney, Agent, or Firm*—Fitzpatrick, Cella, Harper & Scinto

(57) ABSTRACT

A cylindrical lens is constructed by a plurality of optical elements for linearly imaging a laser beam. The cylindrical lens is fixed to an optical frame using an adhesive so as to prevent the adhesive from entering a gap between the optical elements.

14 Claims, 5 Drawing Sheets

CYLINDRICAL LENS AND OPTICAL SCANNING DEVICE USING THE LENS

BACKGROUND OF THE INVENTION

1. Field of the Invention

The present invention relates to a cylindrical lens that is used in, e.g., an image forming apparatus, and linearly images a laser beam originating from a laser light source, and an optical scanning device that uses the cylindrical lens and images a laser beam, deflected by a deflection means, onto a surface to be scanned via an imaging lens.

2. Related Background Art

In a conventional optical scanning device used in an image forming apparatus, such as a laser printer or the like, as shown in, e.g., FIG. 1, a laser unit 2 is fixed to a predetermined position of an optical frame 1. A laser beam L coming from the laser unit 2 is linearly focused by a cylindrical lens 3, is deflected by a polygonal mirror 4, which is rotated by the drive force of a drive motor 5, and forms a beam spot on a surface 8 to be scanned of a photosensitive body via imaging lenses 6 and 7.

As shown in FIG. 2, the cylindrical lens 3 has an integrated structure obtained by adhering a first lens 3a having a positive refractive power, and a second lens 3b having a negative refractive power, to each other. When the cylindrical lens 3 is fixed to the optical frame 1, an adhesive 9 is interposed between the optical frame 1 and cylindrical lens 3, the position of the cylindrical lens 3 is adjusted to form a desired spot shape on the surface 8 to be scanned, and the lens 3 is then fixed.

However, the cylindrical lens 3 is adjusted before the adhesive 9 is set. During the adjustment, the adhesive 9 may enter the effective portion from a gap 3c between the first and second lenses 3a and 3b. For this reason, in the conventional optical scanning device, the adhesive that has entered the effective portion of the cylindrical lens 3 intercepts, refracts, and scatters the laser beam, and the spot image on the surface 8 to be scanned may deform. When such optical scanning device is used in the image forming apparatus, the image quality deteriorates.

SUMMARY OF THE INVENTION

It is an object of the present invention to solve the above-mentioned problem, and to provide a cylindrical lens that can prevent an adhesive from entering the gap between optical elements, and an optical scanning device using the lens.

In order to achieve the above object, according to the present invention, a cylindrical lens, which is comprised of a plurality of optical elements and linearly images a laser beam, comprises adhesive entrance preventing means for preventing an adhesive used for fixing the optical elements to an optical frame from entering a gap between the optical elements.

Also, an optical scanning device according to the present invention comprises a laser light source for emitting a laser beam, a cylindrical lens, which is comprised of a plurality of optical elements and linearly images a laser beam, deflection means for deflecting the laser beam coming from the cylindrical lens, an imaging lens for imaging the laser beam from the deflection means on a surface to be scanned, an optical frame for holding the cylindrical lens, and adhesive entrance preventing means for preventing an adhesive, used for fixing the cylindrical lens to the optical frame, from entering a gap between the optical elements.

DETAILED DESCRIPTION OF THE PREFERRED EMBODIMENTS

The present invention will be described in detail hereinafter on the basis of its embodiments illustrated in FIGS. 3 to 9.

Figure 1:
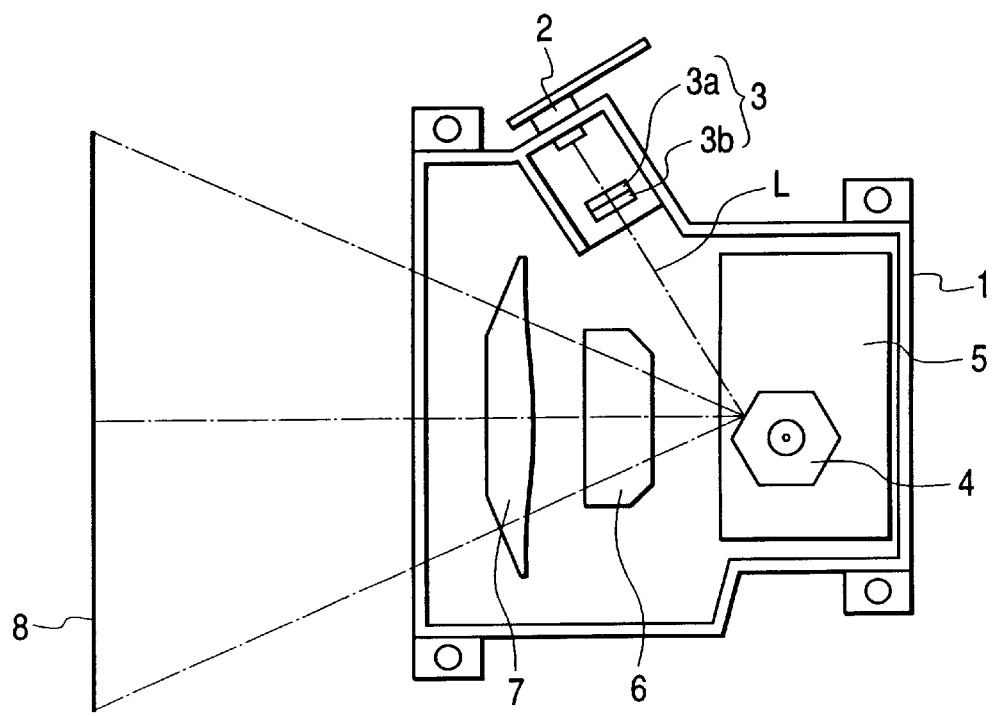
FIG. 1 is view showing the arrangement of a conventional optical scanning device.
Figure 2:
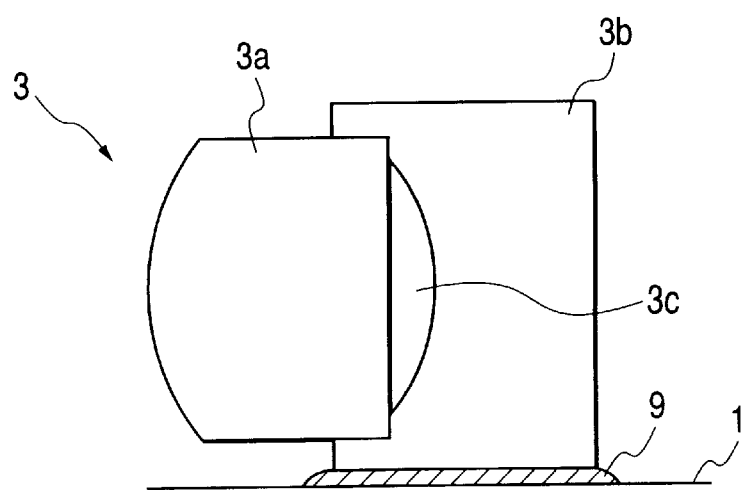
FIG. 2 is an enlarged view of a cylindrical lens portion.
Figure 3:
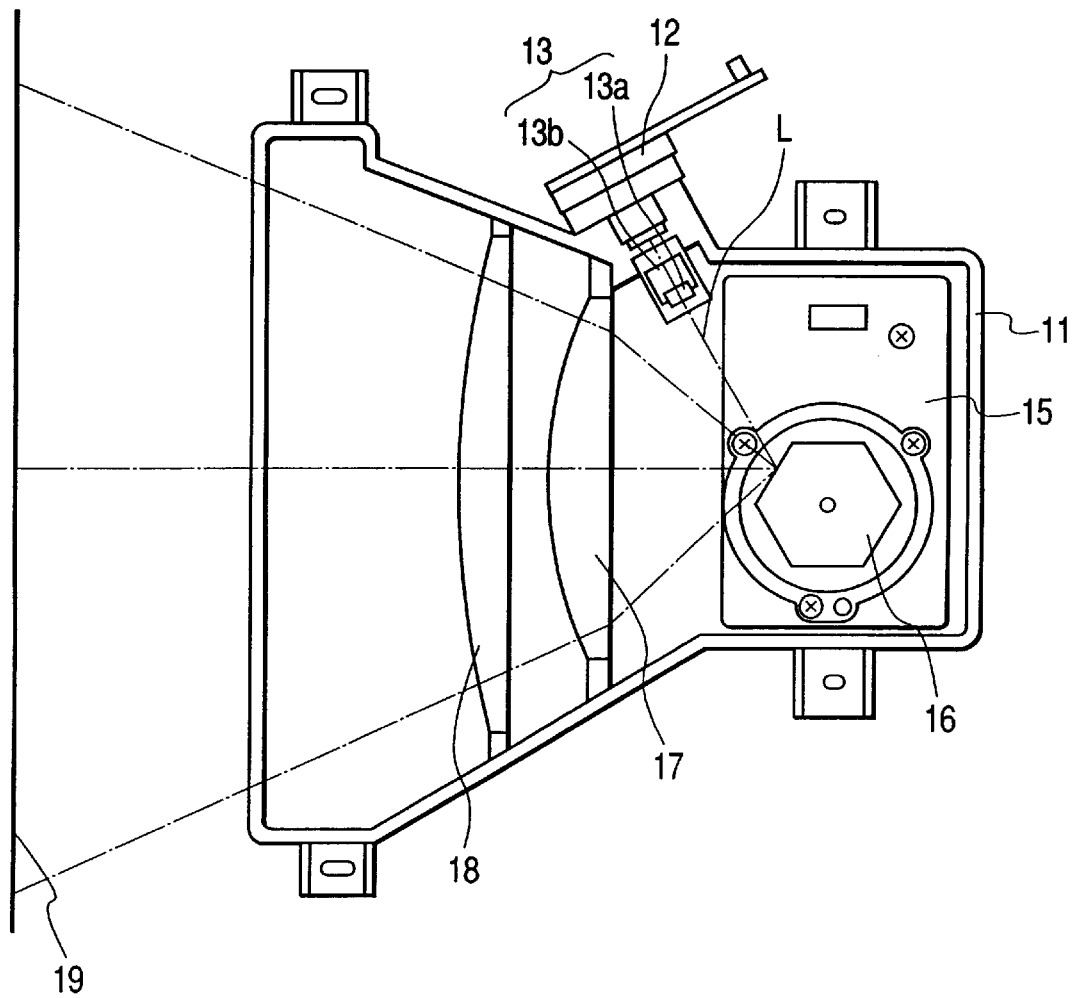
FIG. 3 is a plan view showing an optical scanning device according to the first embodiment of the present invention.

FIG. 3 is a plan view of an optical scanning device according to the first embodiment of the present invention. A laser unit 12 for emitting a laser beam L is attached to a predetermined position of an optical frame 11. In the direction in which the laser beam L originating from the laser unit 12 travels, a cylindrical lens 13 having first and second lenses 13a and 13b, and a polygonal mirror 16, as a deflector supported by a drive motor 15, are placed in turn. The cylindrical lens 13 linearly images the laser beam L coming from the laser unit 12 on a deflection reflection surface of the polygonal mirror 16, which deflects the laser beam L coming from the cylindrical lens 13. In the direction in which the laser beam L deflected by the polygonal mirror 16 travels, imaging lenses 17 and 18, and a surface 19 to be scanned, are placed. The members 11 to 18 are fixed to the optical frame 11, and the surface 19 to be scanned is a surface of a photosensitive body as a recording medium, which is rotatably placed outside the optical frame 11.

The first lens 13a of the cylindrical lens 13 consists of glass having a positive refractive power, and the second lens 13b consists of plastic having a negative refractive power. The cylindrical lens 13 is adjusted to be able to form a spot image with a desired shape on the surface 19 to be scanned, and is fixed to the optical frame 11 by an adhesive. The imaging lenses 17 and 18 have f-θ characteristics. Of these imaging lenses 17 and 18, for example, the imaging lens 18 is a plastic anamorphic lens having an aspheric shape. The cylindrical lens 13 is placed so that its imaging point is located at the object point of the imaging lenses 17 and 18, and has a temperature compensation function. With this function, even when the focal length of the imaging lens 18 has changed due to a change in temperature, the cylindrical lens 13 can prevent the spot image on the surface 19 to be scanned from deforming.

Figure 4:
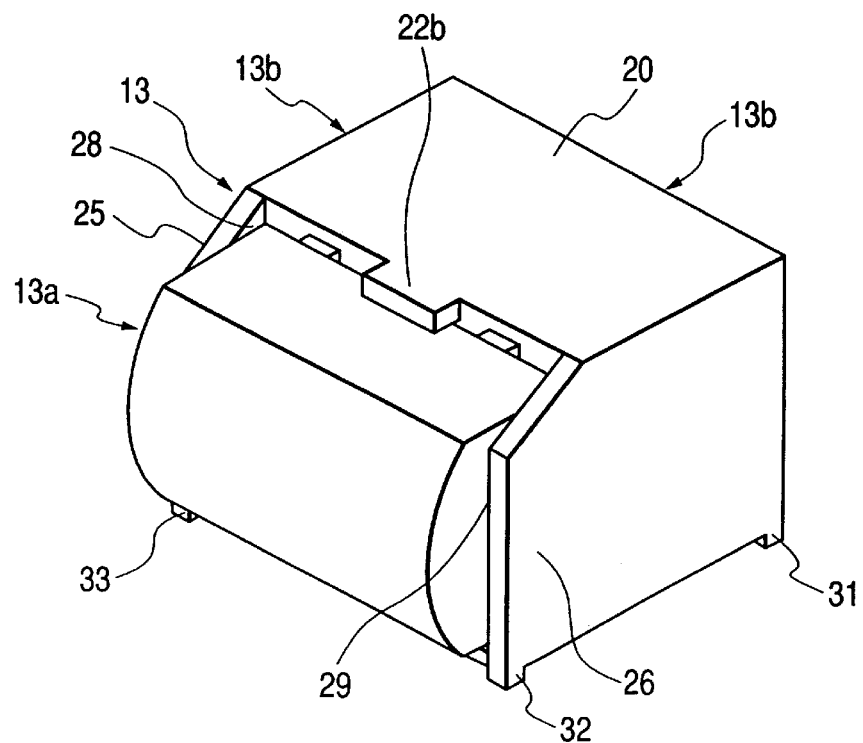
FIG. 4 is a perspective view of a cylindrical lens.
Figure 5:
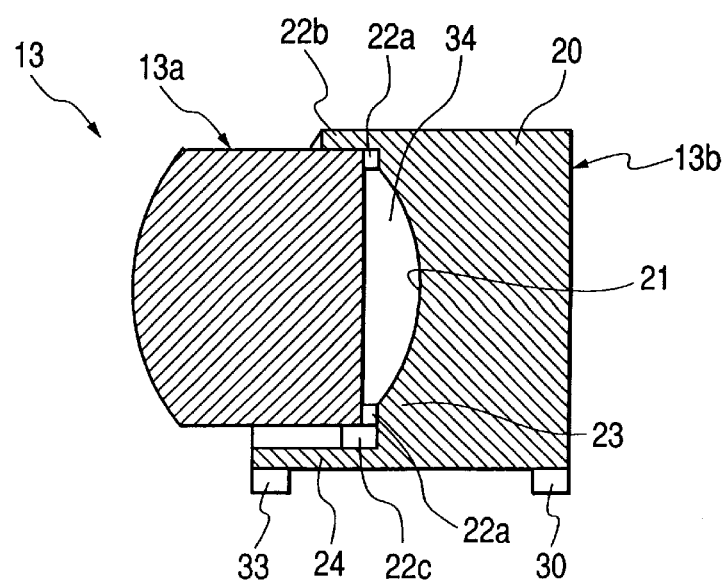
FIG. 5 is a longitudinal sectional view of FIG. 4.
Figure 6:
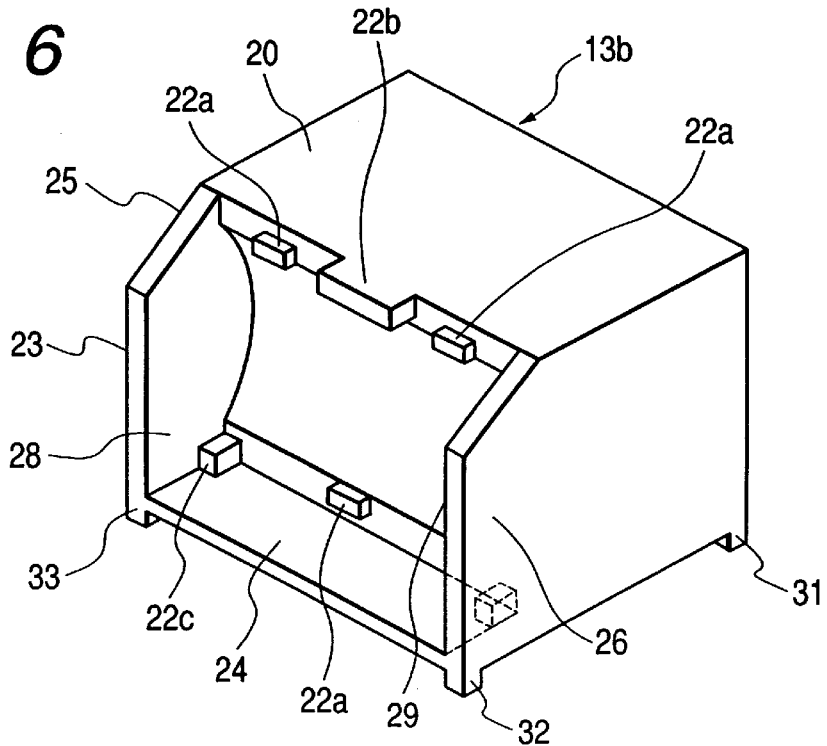
FIG. 6 is a perspective view of a second lens.

FIG. 4 is a perspective view of the cylindrical lens 13, FIG. 5 is a longitudinal sectional view of FIG. 4, and FIG. 6 is a perspective view of the second lens 13b. The second lens 13b has a box-shaped lens body 20. A concave surface portion 21 is formed on the lens body 20 on the joint side with the first lens 13a, and serves as an effective portion for effectively refracting the laser beam L. Around the concave surface portion 21, a contact reference surface 22a, for regulating the spacing from the first lens 13a in the optical axis direction, is formed. A fitting portion 23 for receiving the first lens 13a is integrally formed on the lens body 20 on the concave surface portion 21 side. When the first lens 13a is fitted into the fitting portion 23 and comes into contact with the contact reference surface 22a in the axial direction, and upper and lower contact reference surfaces 22b and 22c, the optical axes of the first and second lenses 13a and 13b substantially agree with each other.

The fitting portion 23 is constructed by a bottom plate 24 and side plates 25 and 26, and the reference surfaces 22a, 22b, and 22c upon fitting the first lens 13a into the fitting portion 23 are respectively formed on upper and lower recess portions and the bottom plate 24 of the fitting portion 23. The inner surfaces of the side plates 25 and 26 respectively serve as adhesive land portions 28 and 29 for holding an adhesive used for fixing the first lens 13a and a small gap is formed between the first lens 13a and the concave surface portion 21 of the second lens 13b. Reference portions 30 to 33, used for precisely aligning the second lens 13b to the optical frame 11, are formed on the lower surfaces of the lens body 20 and side plates 25 and 26.

Figure 7:
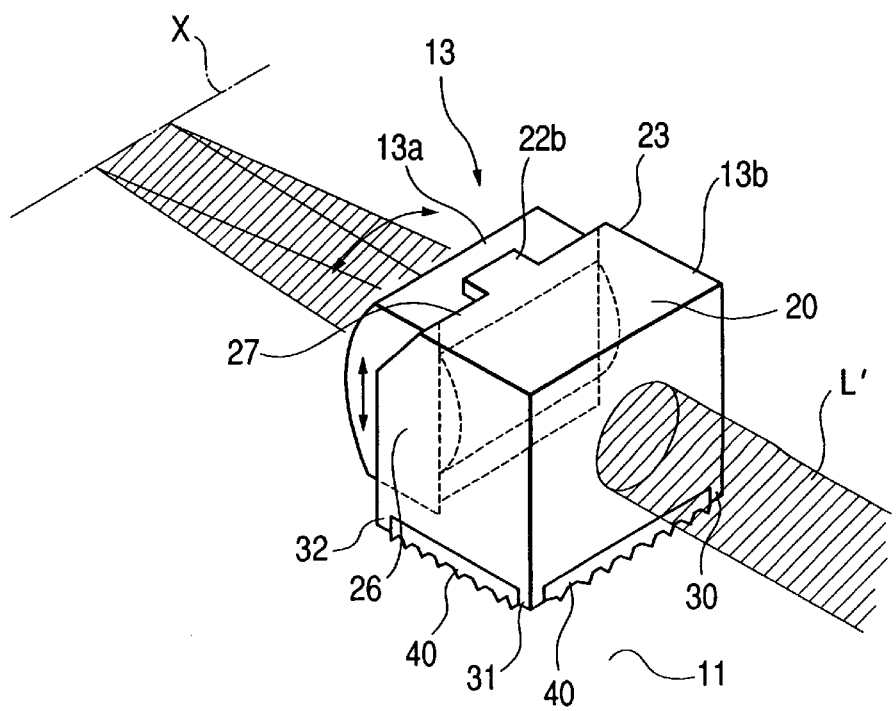
FIG. 7 is an explanatory view of a method of adjusting a first lens with respect to the first lens.

Upon assembling the first and second lenses 13a and 13b, as shown in the perspective view of FIG. 7, the first lens 13a is fitted into the fitting portion 23 by bringing it into contact with the contact reference surfaces 22a, 22b, and 22c from the space between the side plates 25 and 26 of the second lens 13b, so that the optical axes of the first and second lenses 13a and 13b precisely agree with each other. An ultraviolet setting adhesive is applied on the adhesive land portions 28 and 29, and is set by irradiating ultraviolet rays, thus integrating the first and second lenses 13a and 13b. Subsequently, a laser beam L' which is the same as the above-mentioned laser beam L is transmitted through the first and second lenses 13a and 13b to observe the imaging position of the laser beam L', and the position of the integrated cylindrical lens 13 is adjusted so that a line image is formed at a desired position on an ideal axis X.

Upon fixing the integrated cylindrical lens 13 to the optical frame 11, an adhesive 40 is interposed between the second lens 13b and optical frame 11, and is set after the position of the second lens 13b in the optical axis direction is adjusted.

In this optical scanning device, the laser beam L coming from the laser unit 12 is linearly focused by the cylindrical lens 13, is deflected by the polygonal mirror 16, and forms a beam spot on the surface 19 to be scanned by the imaging lenses 17 and 18. In this case, a change in imaging position of the imaging lenses 17 and 18 resulting from a temperature change is corrected by the cylindrical lens 13.

In the first embodiment, since the second lens 13b has the fitting portion 23 for receiving the first lens 13a, an adhesive can be prevented from entering a gap 34 between the first and second lenses 13a and 13b upon fixing the cylindrical lens 13 to the optical frame 11. Also, this fitting portion 23 can prevent the adhesive from entering the effective portion between the first and second lenses 13a and 13b. Furthermore, the fitting portion 23 prevents the gap between the first and second lenses 13a and 13b from being exposed. Hence, the laser beam can be prevented from being intercepted, refracted, scattered, and so forth by the adhesive, and a desired spot image can be formed on the surface 19 to be scanned. When the optical scanning device is used in an image forming apparatus, a high-quality image can be obtained.

Figure 8:
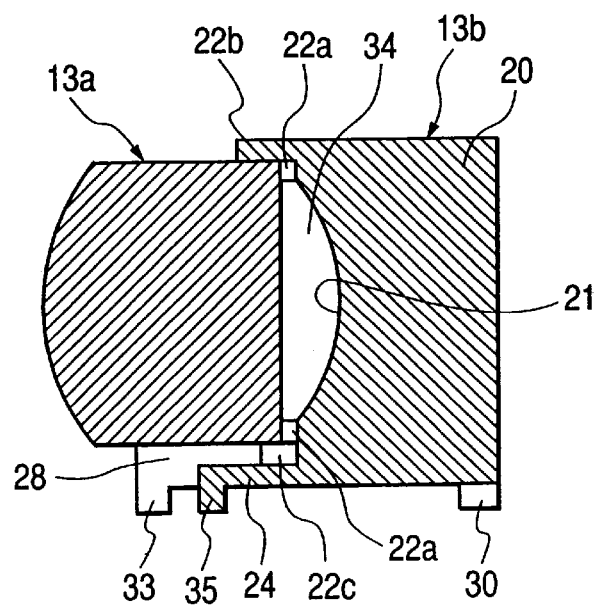
FIG. 8 is a sectional view of a cylindrical lens according to the second embodiment of the present invention.
Figure 9:
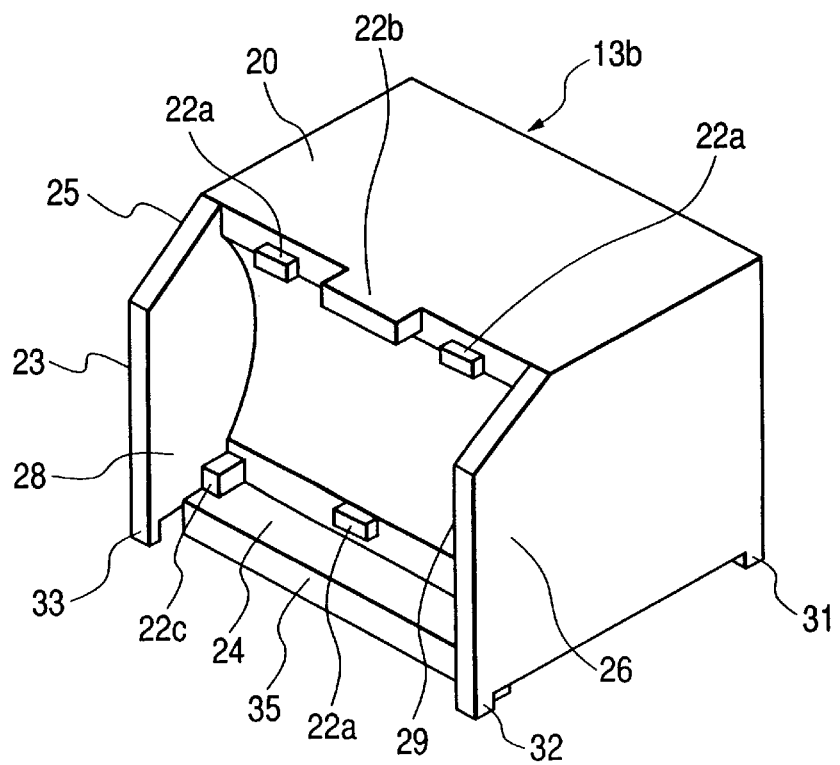
FIG. 9 is a perspective view of a second lens.

FIG. 8 is a longitudinal sectional view of a cylindrical lens 13' according to the second embodiment of the present invention, and FIG. 9 is a perspective view of a second lens 13b. A partitioning plate 35 projects downward from the lower surface of a bottom plate 24 at the entrance of a fitting portion 23 of a second lens 13b' along the edge of the bottom plate 24. The height of the partitioning plate 35 is set to substantially reach a plane formed by reference portions 30 to 33, so that an adhesive used for adhesion with an optical frame 11 can be prevented from entering the fitting portion 23. The second embodiment can obtain the same effect as in the first embodiment, and can prevent the adhesive from entering the fitting portion 23 from the bottom plate 24 side more satisfactorily than the first embodiment.

Note that the method of adjusting the optical axis of the first lens 13 to that of the second lens 13b or 13b' is not limited to the above-mentioned method. For example, a method of imaging the laser beam L on the surface 19 to be scanned and checking its spot shape can also assure precise adjustment. The fitting portion 23 of the first embodiment or the partitioning plate 35 of the second embodiment is integrally formed, but may be fixed to the lens body 20 as an independent member.

To restate, in the optical scanning device of the present invention, the laser unit for emitting a laser beam, the cylindrical lens 13 for linearly imaging the laser beam L coming from the laser unit, the polygonal mirror for deflecting the laser beam coming from the cylindrical lens 13, and the imaging lenses for imaging the laser beam from the polygonal mirror on the surface to be scanned are placed in the optical frame. The cylindrical lens 13 comprises the first and second lenses 13a and 13b, and the second lens 13b is formed with the fitting portion 23 for receiving the first lens 13a. Upon fixing the cylindrical lens 13 to the optical frame using an adhesive, the fitting portion 23 can prevent the adhesive from entering the gap 34 between the first and second lenses 13a and 13b.

As described above, since a cylindrical lens and optical scanning device using the lens according to the present invention comprise adhesive entrance preventing means for preventing an adhesive from entering the gap between optical elements of the cylindrical lens, the laser beam can be prevented from being intercepted, refracted, scattered, and so on, and a spot image can be prevented from deforming. Also, when the optical scanning device is used in an image forming apparatus, a high-quality image can be obtained.

What is claimed is:

1. A cylindrical lens, which is constructed by a plurality of optical elements and linearly images a laser beam, comprising:

a first lens having a lower surface;

a second lens having a fitting portion receiving said first lens and a lower surface fixable to an optical frame by means of an adhesive; and an adhesive entrance preventing device preventing the adhesive used for fixing said cylindrical lens to the optical frame from entering a gap between said first and second lenses, said adhesive entrance preventing device comprising a lower projection having a lower contact reference surface abutting the lower surface of said first lens and a bottom plate spaced from the lower surface of said first lens, wherein said bottom plate extends beyond said lower projection along the optical axis of said second lens.

2. An optical system comprising:

a first lens having a lower surface; and a second lens having a fitting portion receiving said first lens and a lower surface adapted to be fixed to an optical frame by means of an adhesive, said fitting portion comprising a lower projection having a lower contact reference surface abutting the lower surface of said first lens and a bottom plate spaced from the lower surface of said first lens, wherein said bottom plate extends beyond said lower projection along the optical axis of said second lens.

3. An optical system according to claim 2, wherein said bottom plate has a lower surface located on the same plane as the lower surface of said second lens, and both the lower surface of said bottom plate and the lower surface of said second lens are adapted to be fixed to an optical frame.

4. An optical system according to claim 3, wherein said first lens has a pair of side surfaces and said fitting portion has a pair of side plates enclosing the side surfaces of said first lens.

5. An optical system according to claim 4, wherein said pair of side plates have lower surfaces and reference portions are provided as projecting downward from the lower surface of said second lens and the lower surfaces of said pair of side plates for aligning the second lens to the optical frame.

6. An optical system according to claim 5, wherein a partitioning plate is provided as projecting from the lower surface of said bottom plate along the edge of the bottom plate.

7. An optical system according to claim 2, wherein said first lens has an upper surface and said fitting portion has an upper projection having an upper contact reference surface abutting the upper surface of said first lens.

8. An optical system according to claim 2, wherein said fitting portion has an axial contact reference surface regulating the spacing between the first lens and the second lens in the optical axis direction.

9. An optical system according to claim 2, wherein said first lens is a cylindrical lens having a positive refractive power and said second lens is a cylindrical lens having a negative refractive power.

10. An optical scanning device comprising:

a laser light source for emitting a laser beam;

an optical system as defined in any of claims 2 through 9 for linearly imaging the laser beam coming from said laser light source;

an optical deflector for deflecting the laser beam coming from said optical system;

an imaging lens for imaging the laser beam deflected by said optical deflector; and an optical frame holding said optical system.

11. An optical scanning device according to claim 10, wherein said imaging lens comprises at least a plastic anamorphic lens, and said optical system is placed with an imaging point thereof being located at an object point of said imaging lens.

12. An image forming apparatus comprising:

a laser light source for emitting a laser beam;

an optical system as defined in any of claims 2 through 9 for linearly imaging the laser beam coming from said laser light source;

an optical deflector for deflecting the laser beam coming from said optical system;

a recording medium;

an imaging lens for imaging the laser beam deflected by said optical deflector on said recording medium; and an optical frame holding said optical system.

13. An image forming apparatus according to claim 12, wherein said imaging lens comprises at least a plastic anamorphic lens, and said optical system is placed with an imaging point thereof being located at an object point of said imaging lens.

14. An optical device comprising:

an optical system as defined in any of claims 2 through 9;

an optical frame holding said optical system; and an adhesive fixing said optical system to said optical frame.

* * * * *